United States Patent
Kruglick

(10) Patent No.: US 10,049,045 B2
(45) Date of Patent: *Aug. 14, 2018

(54) MANAGEMENT OF CHIP MULTIPROCESSOR COOPERATIVE CACHING BASED ON EVICTION RATE

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,020

(22) Filed: Mar. 5, 2017

(65) Prior Publication Data

US 2017/0177480 A1 Jun. 22, 2017

Related U.S. Application Data

(63) Continuation of application No. 13/989,798, filed as application No. PCT/US2012/048026 on Jul. 25, 2012, now Pat. No. 9,588,900.

(51) Int. Cl.
*G06F 12/00* (2006.01)
*G06F 12/0808* (2016.01)
(Continued)

(52) U.S. Cl.
CPC ...... *G06F 12/0808* (2013.01); *G06F 12/0815* (2013.01); *G06F 12/0842* (2013.01); *G06F 2212/621* (2013.01)

(58) Field of Classification Search
CPC ............. G06F 12/0891; G06F 12/0806; G06F 12/0813; G06F 12/0817; G06F 2212/502; G06F 2212/6042

See application file for complete search history.

(56) References Cited

U.S. PATENT DOCUMENTS 6,058,456 A    5/2000  Arimilli et al.
7,469,407 B2 * 12/2008 Burky ................. G06F 9/3851
                                                        711/135

(Continued)

OTHER PUBLICATIONS

Batsakis, A., and Burns, R.C., "NFS-CD: Write-Enabled Cooperative Caching in NFS," IEEE Transactions on Parallel and Distributed Systems, vol. 19, Issue 3, Mar. 2008, pp. 323-333.

(Continued)

*Primary Examiner* — Matthew Bradley
*Assistant Examiner* — Francisco A Grullon

(57) ABSTRACT

Techniques described herein generally include methods and systems related to cooperatively caching data in a chip multiprocessor. Cooperatively caching of data in the chip multiprocessor is managed based on an eviction rate of data blocks from private caches associated with each individual processor core in the chip multiprocessor. The eviction rate of data blocks from each private cache in the cooperative caching system is monitored and used to determine an aggregate eviction rate for all private caches. When the aggregate eviction rate exceeds a predetermined value, for example the threshold beyond which network flooding can occur, the cooperative caching system for the chip multiprocessor is disabled, thereby avoiding network flooding of the chip multiprocessor.

23 Claims, 5 Drawing Sheets

(51) Int. Cl.
*G06F 12/0815* (2016.01)
*G06F 12/0842* (2016.01)

(56) References Cited

U.S. PATENT DOCUMENTS

| | | | |
|---|---|---|---|
| 7,694,075 | B1 | 4/2010 | Feekes, Jr. |
| 8,041,897 | B2 | 10/2011 | Biles et al. |
| 2002/0133537 | A1 | 9/2002 | Lau et al. |
| 2008/0120469 | A1 | 5/2008 | Kornegay et al. |
| 2009/0300280 | A1* | 12/2009 | Jutzi .................. G06F 12/0888 711/113 |
| 2010/0023698 | A1* | 1/2010 | Bell, Jr. ................ G06F 12/082 711/133 |
| 2011/0088038 | A1 | 4/2011 | Kruglick |
| 2011/0125971 | A1 | 5/2011 | Kruglick |
| 2011/0271007 | A1 | 11/2011 | Wang et al. |
| 2012/0102137 | A1* | 4/2012 | Pruthi ................. G06F 12/0813 709/213 |
| 2013/0124826 | A1* | 5/2013 | Merchant .............. G06F 9/3851 712/205 |
| 2014/0032843 | A1 | 1/2014 | Kruglick |

OTHER PUBLICATIONS

Bernstein, K., "New Dimensions in Microarchitecture," DARPA Microsystems Technology Symposium, Mar. 6, 2007, pp. 1-13.
Chang, J., and Sohi, G.S., "Cooperative Cache Partitioning for Chip Multiprocessors," Proceedings of the 21st Annual International Conference on Supercomputing, Jun. 18-20, 2007, pp. 242-252.
Chang, J., et al., "Cooperative Caching for Chip Multiprocessors," Proceedings of the 33rd Annual International Symposium on Computer Architecture, Jun. 17, 2006, pp. 264-276.
Choi, I., et al., "Experience with Improving Distributed Shared Cache Performance on Tilera's Tile Processor," IEEE Computer Architecture Letters, Jul.-Dec. 2011, pp. 45-48, vol. 10, No. 2.
Du, J., et al., "Management Policies Analysis for Multi-Core Shared Caches," Advanced Data Mining and Applications, Nov. 19-21, 2010, pp. 514-521, vol. 6441.
Howard, J., et al., "A 48-Core IA-32 Processor in 45 nm CMOS Using On-Die Message-Passing and DVFS for Performance and Power Scaling," IEEE Journal of Solid-State Circuit, Jan. 2011, pp. 173-183, vol. 6, No. 1.
International Search Report and Written Opinion of the International Searching Authority, International application No. PCT/US2012/048026, dated Jan. 16, 2013.
Kang, D.-I., et al., "Preliminary Study Toward Intelligent Run-Time Resource Management Techniques for Large Multi-Core Architectures," DAPRA, 2007, pp. 1-2.
Kumar, R., et al., "Interconnections in Multi-core Architectures: Understanding Mechanisms, Overheads and Scaling" Proceedings 32nd International Symposium on Computer Architecture, Jun. 4-8, 2005, pp. 408-419 , vol. 33, Issue 2.
Mattson, T. G., et al., "The 48 Core SCC Processor: A Programmer's View," Proceedings of the 2010 ACM/ IEEE International Conference for High Performance Computing, Networking, Storage and Analysis, Nov. 13-19, 2010, pp. 11.
Pugsley, S. H., et al., "SWEL: Hardware Cache Coherence Protocols to Map Shared Data onto Shared Caches," Proceedings of the 19th international conference on Parallel architectures and compilation techniques, Sep. 11-15, 2010, pp. 1-11.
Rattner, J., "Single-chip Cloud Computer," An experimental many-core processor from Intel Labs, Intel Corporation, 2010, pp. 1-18.
Sartor, J. B., et al., "Cooperative Caching with Keep-Me and Evict-Me," In: 9th Annual Workshop on Interaction between Compilers and Computer Architectures, Feb. 13, 2005, pp. 46-57.
Shimpi, A., "Intel's Medfield & Atom Z2460 Arrive for Smartphones: It's Finally Here," accessed at: https://web.archive.org/web/20130508065345/http://www.anandtech.com/show/5365/intels-medfield-atom-z2460-arrive-for-smartphones, posted on Jan. 10, 2012, pp. 14.
Van Tol, M.W., et al.,"Efficient Memory Copy Operations on the 48-core Intel SCC Processor," 3rd Many-core Applications Research Community (MARC) Symposium, 2011, pp. 13-18.
Wijngaart, R.F.V., et al., "Light-weight Communications on Intel's Single-Chip Cloud Computer Processor," ACM SIGOPS Operating Systems Review, Jan. 2011, pp. 73-83, vol. 45, Issue 1.
Jichuan Chang, "Cooperative Caching for Chip Multiprocessors" [online], University of Wisconsin-Madison, 2007. [retrieved on Dec. 2, 2012]. Retrieved from the Internet: <URL:http://reference.kfupmedu.sa/content/c/o/cooperative_caching_for_multiproces_68345.pdf>.

* cited by examiner

MANAGEMENT OF CHIP MULTIPROCESSOR COOPERATIVE CACHING BASED ON EVICTION RATE

CROSS-REFERENCE TO RELATED APPLICATIONS

The present application is a continuation application under 35 U.S.C. § 120 of U.S. patent application Ser. No. 13/989,798, filed on May 26, 2013, now U.S. Pat. No. 9,588,900, which is the U.S. National Stage filing under 35 U.S.C. § 371 of International Application No. PCT/US2012/048026, filed on Jul. 25, 2012, entitled "MANAGEMENT OF CHIP MULTIPROCESSOR COOPERATIVE CACHING BASED ON EVICTION RATE." International Application No. PCT/US2012/048026 and U.S. patent application Ser. No. 13/989,798, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

In keeping with Moore's Law, the number of transistors that can be practicably incorporated into an integrated circuit has doubled approximately every two years. This trend has continued for more than half a century and is expected to continue until at least 2015 or 2020. However, simply adding more transistors to a single-threaded processor no longer produces a significantly faster processor. Instead, increased system performance has been attained by integrating multiple processor cores on a single chip to create a chip multiprocessor and sharing processes between the multiple processor cores of the chip multiprocessor. Furthermore, the multiple processor cores of a chip multiprocessor can share other common system components, which may facilitate the manufacture of a system that is lower in cost and smaller in size compared to multiple single-core processors that collectively may have the same processing performance.

SUMMARY

In accordance with at least some embodiments of the present disclosure, a system of cooperatively caching data in a chip multiprocessor is managed based on on an eviction rate of data blocks from private caches associated with each individual processor core in the chip multiprocessor. Specifically, the eviction rate of data blocks from each private cache in the cooperative caching system is monitored and used to determine an aggregate eviction rate for all private caches. When the aggregate eviction rate exceeds a predetermined value, for example the threshold beyond which network flooding can occur, the cooperative caching system for the chip multiprocessor is disabled, thereby avoiding network flooding of the chip multiprocessor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
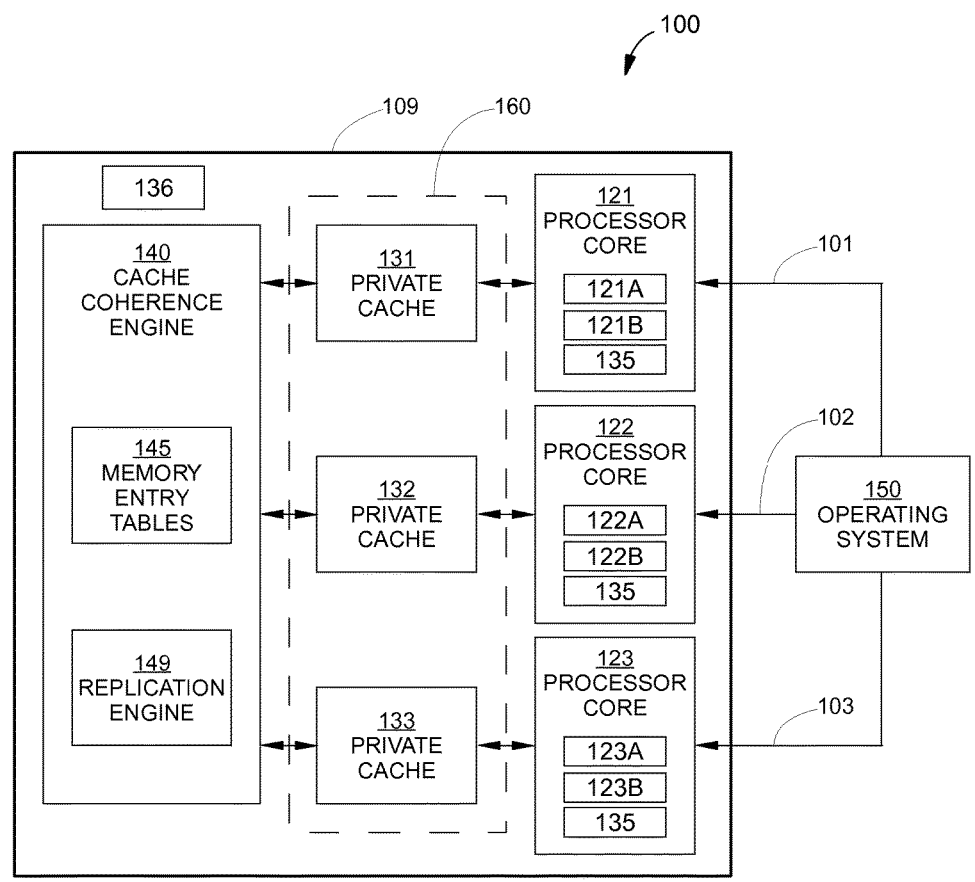
FIG. 1 shows a block diagram of an example embodiment of a chip multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Due to the increasing demand placed on on-chip storage by high core-count chip multiprocessors and the increasing cost of off-chip cache misses for such multiprocessors, systems of "cooperative caching" have been developed that provide a unified framework for managing on-chip cache resources. Cooperative caching is intended to combine the strengths of private and shared cache configurations by forming an aggregate shared cache through cooperation among private caches. Cooperative caching can generally be applied in a chip multiprocessor with a plurality of processor cores, each core having an associated private cache.

Under a cooperative caching scheme, a locally active data block is generally stored in a private cache associated with the accessing processor core or in a private cache of a neighboring processor core that has storage space available. In this way, the accessing processor core reduces latency by avoiding references to on-chip storage located relatively remotely from the processor core and to the much more costly off-chip storage. In addition, globally active data blocks are identified and replicated in one or more private caches to further reduce cache latency. Such replication reduces cache latency since more requests by processor cores can be satisfied by replicated copies of the data blocks rather than by requests to off-chip memory. To increase the number of on-chip unique data blocks available, cooperative caching typically uses a replication-aware data block replacement scheme that favors unique blocks in the replacement process and therefore improves the probability that a processor core will find a desired data block in the aggregate on-chip cache.

In some situations, an issue referred to as "spillage" or "network flooding" can occur with such cooperative caching schemes. When the working set used by a chip multiprocessor is slightly larger than each local cache of the chip multiprocessor and is continuously cycling through normal use, a cascade of evictions and replacements can occur that results in a massive increase in on-chip network traffic. This cascading effect occurs when duplicate entries are present in multiple private caches of the aggregate on-chip cache and a unique data block that has not been recently used in a particular private cache is evicted from that private cache. In order to maximize the number of unique data blocks available somewhere in the aggregate on-chip cache, the evicted unique data block is rewritten in place of one of the duplicate entries, which is itself evicted. The evicted duplicate entry may then be rewritten in place of a different duplicate entry somewhere in the aggregate on-chip cache. This process can repeatedly cycle through the different private caches making up the aggregate on-chip cache, creating a continuous set of data block spillage and associated network traffic. This increase in network traffic can congest a chip multiprocessor indefinitely and/or cause instability in the chip multiprocessor.

Embodiments disclosed herein contemplate systems, methods, and/or devices for managing cooperative caching in a chip multiprocessor based on an eviction rate of data blocks from the private caches associated with each individual processor core in the chip multiprocessor. Specifically, the eviction rate of data blocks from each private cache in the cooperative caching system is monitored and used to determine an aggregate eviction rate for all private caches. When the aggregate eviction rate exceeds a predetermined value, for example the threshold beyond which network flooding can occur, the cooperative caching system for the chip multiprocessor is disabled, thereby avoiding network flooding of the chip multiprocessor. In some embodiments, the cooperative caching system is disabled in two phases. In the first phase, as the aggregate eviction rate reaches a first threshold, for example a predetermined "caution range" that indicates that network flooding can potentially occur, new data replication is stopped. In the second phase, as the aggregate eviction rate reaches a higher second threshold, indicating that network flooding is imminent, the private caches are effectively converted into local-write only caches that still permit the reading of data across the chip. In this second phase of cooperative cache disablement, previously placed data can still be accessed so that the chip multiprocessor still functions, but the cascading cycle of evictions and replacements of already stored data blocks is immediately stopped and network flooding avoided. In some embodiments, the second phase of cooperative cache disablement is implemented by designating all data blocks in the aggregate cache as unique, thereby preventing the eviction of data in any private cache in favor of data that has been evicted from any other private cache.

FIG. 1 shows a block diagram of an example embodiment of a chip multiprocessor (CMP) 100, arranged in accordance with at least some embodiments of the present disclosure. CMP 100 is configured with a system for cooperatively caching data therein that reduces off-chip access by processor cores included in CMP 100. CMP 100 is a multi-core processor formed from a single integrated circuit die 109 that may be configured to carry out parallel processing tasks 101-103 (e.g., process multiple threads) using multiple processor cores 121-123 formed on die 109. In addition to processor cores 121-123, CMP 100 includes multiple private caches 131-133, which are each associated with a specific processor core of CMP 100. In some embodiments, CMP 100 may also include a cache coherence engine 140 to implement a desired cooperative caching scheme. While CMP 100 is illustrated with only three processor cores, it is noted that embodiments of the present disclosure may be applied to chip multiprocessors having many more than three processor cores. In fact, embodiments of the present disclosure generally may be more beneficial in chip multiprocessors having very large numbers of processor cores, e.g., 100 to 1000 or more.

Processor cores 121-123 receive processing tasks 101-103, respectively, from an operating system 150 as shown. In some embodiments, operating system 150 may route tasks 101-103 to processor cores 121-123 via a global queue and dispatcher (not shown). In addition to the on-chip storage provided to processor cores 121-123 by private caches 131-133, each of processor cores 121-123 may have additional dedicated on-chip storage. For example, in some embodiments, each of processor cores 121-123 may include an instruction buffer and a data buffer, which are sometimes referred to together as "L1 cache." Thus, in such an embodiment, processor core 121 includes an instruction buffer 121A and a data buffer 121 B, processor core 122 includes an instruction buffer 122A and a data buffer 122B, and processor core 123 includes an instruction buffer 123A and a data buffer 123B. In various embodiments of the present disclosure, instruction buffers 121A-123A and data buffers 121B-123B are typically not included in cooperative caching schemes.

Private caches 131-133, are formed on die 109 with processor cores 121-123, and are each associated with a specific processor core. Specifically, each of private caches 131-133 is preferentially owned and operated by a particular one of processor cores 121-123. Typically, each of private caches 131-133 is formed proximate or adjacent to the processor core associated therewith, to minimize latency during operation of CMP 100. In the embodiment illustrated in FIG. 1, private cache 131 is associated with processor core 121, private cache 132 is associated with processor core 122, and private cache 133 is associated with processor core 123. Thus, unique data blocks that have been recently used by processor core 121 are preferentially stored in private cache 131. If private cache 131 is full, such data blocks are instead stored in the closest or one of the closest private caches 131-133 that does have available storage capacity. Consequently, any unused storage capacity in one private cache is readily available for other processor cores 121-123 besides the nominal "owning" processor core. In this way, private caches 131-133 collectively form an aggregate cache 160 for processor cores 121-123 that can greatly reduce the number of off-chip requests made by processor cores 121-123.

Without cooperative caching of private caches 131-133, any time a private cache is filled (e.g., private cache 131), and a new and unique data block is stored therein by the owning processor core (e.g., processor core 121), an existing data block must be evicted from the private cache, even if an adjacent private cache (e.g., private cache 132) is completely empty, as is the case when the owning processor core (e.g., processor core 122) of the adjacent private cache is inactive. Additional features of cooperative caching, as it pertains to embodiments of the present disclosure, are described below. One configuration of data blocks in private caches 131-133 is illustrated in FIG. 2.

Figure 2:
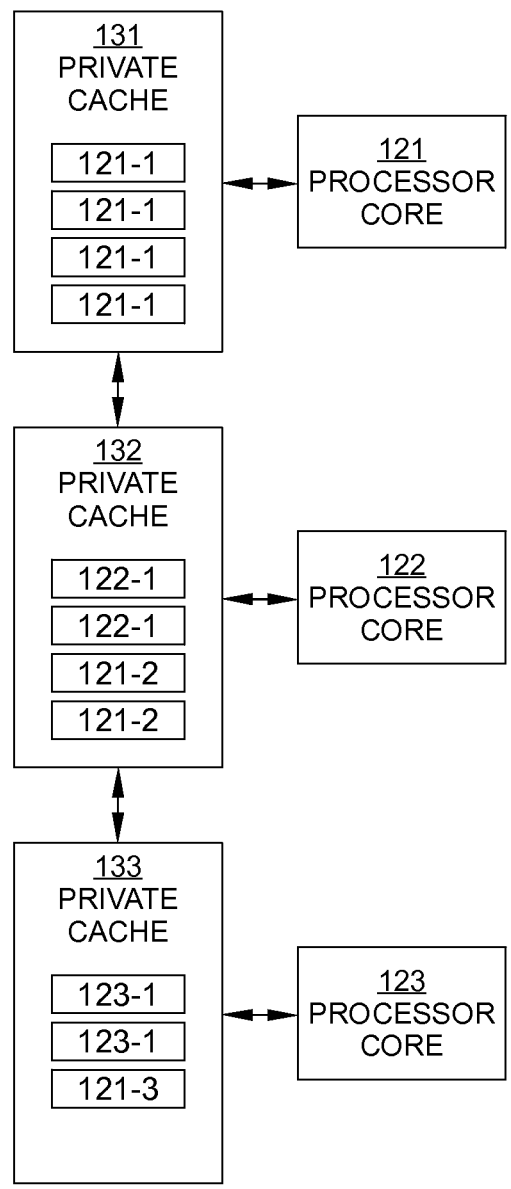
FIG. 2 shows a schematic diagram of the private caches in FIG. 1.

FIG. 2 shows a schematic diagram of the private caches 131-133 in FIG. 1, arranged in accordance with at least some embodiments of the present disclosure. Private caches 131-

133 store data blocks as shown. Private cache 131, which is preferentially owned and operated by processor core 121, includes data blocks 121-1, which each originate from processor core 121. Similarly, private cache 132 is preferentially owned and operated by processor core 122 and includes data blocks 122-1, which each originate from processor core 122. Private cache 133 is preferentially owned and operated by processor core 123 and includes data blocks 123-1, which each originate from processor core 123. Because private cache 131 is full and has no remaining space available, and because processor core 121 is active, additional data blocks 121-2 are stored in storage space available in private cache 132, which fills private cache 132. Because private caches 131 and 132 are both full and processor core 121 requires more on-chip cache, data blocks 121-3, which also originate from processor core 121, are stored in private cache 133. In the embodiment illustrated in FIG. 2, private cache 132 is first filled before data blocks 121-C are stored in private cache 133, because private cache 132 is closer to processor core 121 than private cache 133, thereby minimizing latency associated with requesting data blocks stored outside private cache 131.

In the embodiment illustrated in FIG. 1, each of private caches 131-133 is depicted as a separate entity from the associated processor core. In other embodiments, private caches 131-133 may each be formed together with an associated processor core as a single block of circuitry. It is further noted that in addition to instruction buffers 121A-123A and data buffers 121B-123B, CMP 100 is configured with only a single additional level of caching. It is understood that cooperative caching systems may be applied to chip multiprocessors configured with additional levels of caching and still fall within the scope of the present disclosure.

In some embodiments, each of processor cores 121-123 includes an eviction rate register 135 that is used to monitor the eviction rate of data blocks from the private cache with which the eviction register 135 is associated. Eviction rate registers 135 enable detection of possible and imminent network flooding in CMP 100. For example, in some embodiments, an eviction rate register 135 includes a 16-bit register that is incremented each time a data block is evicted from the associated private cache. In some embodiments, eviction register 135 is then right shifted every N cycles to divide the current total by 2, effectively establishing a recent event-weighted measurement of eviction rate. An averaging module 136 disposed on die 109 may then be used to compute an average of all eviction rate registers 135 on die 109. In some embodiments, averaging module 136 includes an averaging register, and performs such an averaging operation by adding the current values of all eviction rate registers 135 and discarding rightmost added bits as appropriate. In the embodiment illustrated in FIG. 1, eviction rate registers 135 are depicted as elements of processor cores 121-123. In other embodiments, eviction rate registers 135 may be formed as part of private caches 131-133 and/or cache coherence engine 140.

In some embodiments, centralized eviction counters may be used instead of rate registers 135 illustrated in FIG. 1. In such embodiments, directory-based cache coherence is used, and each of processor cores 121-123 notifies cache coherence engine 140 when the processor core evicts a data block. A directory associated with cache coherence engine 140 tracks which data blocks are associated with which of processor cores 121-123 using a tag-state-sharer structure. In such embodiments, the eviction of dirty data blocks is generally notified to the directory. Cache coherence engine 140 maintains multiple eviction counters in cache coherence engine memory, each corresponding to one cache, and periodically computes the aggregated eviction rate based on the eviction counters held in cache coherence engine memory without polling the individual caches. In such embodiments, cache coherence engine 140 may change the singlet/replicate designation for data blocks for one or more of processor cores 121-123 based on a predetermined caution/imminent flooding threshold, as described below in conjunction with FIG. 4.

Cache coherence engine 140 uses a replication-aware data replacement policy to optimize on-chip memory capacity by favoring unique data blocks in the replacement process. A replication engine 149 may be used in some embodiments of cache coherence engine 140 to implement the replication of data blocks and storage of replicated data blocks as desired. The replication-aware data replacement policy increases the number of on-chip unique data blocks, thus improving the probability of finding a given data block in the aggregate on-chip cache, i.e., aggregate cache 160, and minimizing cache misses that have to go to main memory.

The data block replacement policy implemented by cache coherence engine 140 may be configured to preferentially evict replicated data over unique data, evicting unique data only if no replicated data is available. In order to support such a scheme, cache coherence engine 140 maintains memory entry tables 145 that indicate uniqueness of data blocks stored in aggregate cache 160. If no replicated data is available, the eviction policy reduces to a default eviction policy, such as a "least recently used" eviction policy. Additionally, cache coherence engine 140 tracks the core ownership of data blocks and preferentially stores data blocks in one of private caches 131-133 that is located near or adjacent to, or formed as a part of, the core that originated the data block. Consequently, performance of aggregate cache 160 can be almost as good as a very large private cache, since the most used data blocks are stored in close proximity to the core that uses it. In the embodiment illustrated in FIG. 1, memory entry tables 145 are centrally maintained. In other embodiments, memory entry tables 145 may be distributed across processor cores 121-123.

In some embodiments, as illustrated in FIG. 1, cache coherence engine 140 is depicted as a separate entity that is associated with die 109. In such embodiments, coherence engine 140 may include hardware, software and/or firmware, and is positioned proximate private caches 131-133 in order to reduce latency associated with implementing a cache coherency scheme. In other embodiments, coherence engine 140 may comprise algorithms, hardware, software and/or firmware located external to die 109. For example, in some embodiments, the operations of cache coherence engine 140 may be performed in total or in part by operating system 150.

In the embodiment illustrated in FIG. 1, private caches 131-133 are organized as a single cooperative domain, i.e., aggregate cache 160. Cache coherence engine 140 preferentially stores data blocks as close as possible to the originating processor core, but data blocks originating from any of processor cores 121-123 may be stored in any of private caches 131-133. In some embodiments, the private caches in a chip multiprocessor may instead be grouped into multiple cooperative domains. In such embodiments, private caches located within a particular domain cooperatively cache data blocks originating from any of the processor cores that are also located in the domain. An integrated circuit chip architecture that facilitates such embodiments is illustrated in FIG. 3.

Figure 3:
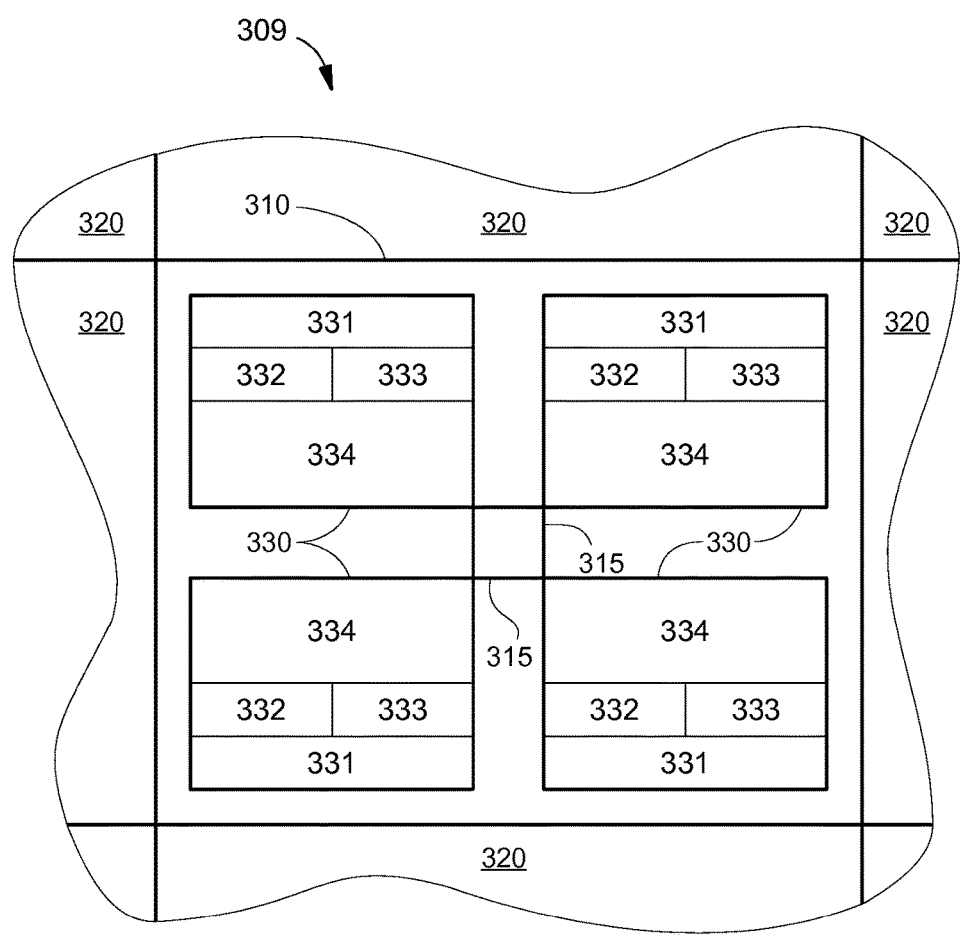
FIG. 3 shows a schematic diagram of a portion of an integrated circuit die.

FIG. 3 shows a schematic diagram of a portion of an integrated circuit die 309 configured in accordance with at least some embodiments of the present disclosure. Integrated circuit die 309 includes a first cooperative caching domain 310, which is surrounded by adjacent and substantially similar neighboring cooperative caching domains 320. First cooperative caching domain 310 includes four circuit blocks 330, which are interconnected by a network 315 as shown. In addition, cooperative caching domain 310 is communicatively coupled to neighboring cooperative caching domains 320 via multiple routers (not shown for clarity), which are also disposed on integrated circuit die 309.

In the embodiment illustrated in FIG. 3, each circuit block 330 includes a processor core 331, an instruction buffer 332, a data buffer 333, and a private cache 334. Thus, each processor core 331 has a private cache 334 that is disposed physically proximate thereto. Furthermore, each private cache 334 is privately owned by the processor core 331 located in the same circuit block 330 so that only that particular processor 331 can directly access said private cache 334. A cooperative caching engine substantially similar to cooperative caching engine 140 in FIG. 1 facilitates the formation of an aggregate cache for first cooperative caching domain 310 via cooperative actions as described above in conjunction with FIG. 1 and also below in conjunction with FIG. 4. The aggregate cache for first cooperative caching domain 310 includes all four of private caches 334 in first cooperative caching domain 310, and can be accessed by all four of the processor cores 331 of first cooperative caching domain 310. For example, for a particular processor core 331, the cooperative caching engine is configured to use remote private caches 334 located in a different circuit block 330 than the processor core 331 to store data that does not fit in the private cache 334 that is located in the same circuit block 330 as the processor core 331. In addition, each of neighboring cooperative caching domains 320 is similarly configured with an aggregate cache, so that each cooperative caching domain on integrated circuit die 309 can take advantage of an aggregate cache to minimize off-chip references.

Thus, through the application of multiple cooperative caching domains on integrated circuit die 309, a number of adjacent circuit blocks 330 disposed in a particular cooperative caching domain can utilize some or all private caches 334 disposed in said cooperative caching domain to maximize utilization of available on-chip memory. At the same time, network traffic and latency are minimized; if integrated circuit die 309 did not include a plurality of cooperative caching domains, processor cores originating data blocks and private caches storing these data blocks may be located relatively far apart on integrated circuit die 309.

Figure 4:
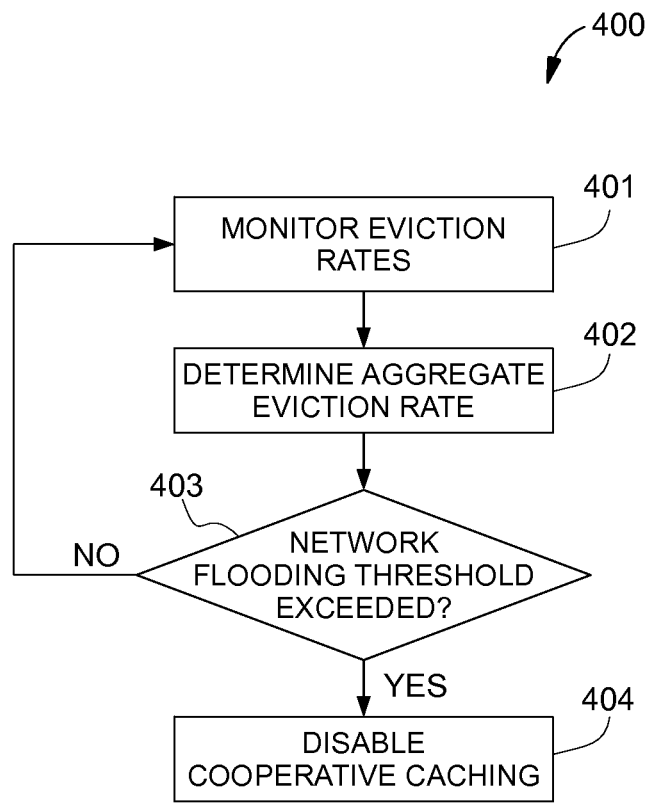
FIG. 4 sets forth a flowchart summarizing an example method for managing cooperative caching in a chip multiprocessor.

FIG. 4 sets forth a flowchart summarizing an example method 400 for managing cooperative caching in a chip multiprocessor, in accordance with at least some embodiments of the present disclosure. Method 400 may include one or more operations, functions or actions as illustrated by one or more of blocks 401-404. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

For ease of description, method 400 is described in terms of a CMP substantially similar to CMP 100 in FIG. 1. One of skill in the art will appreciate that method 400 may be performed by other configurations of CMPs and still fall within the scope of the present disclosure. Prior to the first operation of method 400, network performance of CMP 100 may be analyzed to determine aggregate eviction rates of private caches 131-133 that indicate potential network flooding and/or that indicate imminent network flooding. Suitable threshold values for aggregate eviction rates are then provided to cache coherency engine 140.

Method 400 may begin in block 401 "monitor eviction rates." Block 401 may be followed by block 402 "determine aggregate eviction rate," block 402 may be followed by block 403 "network flooding threshold exceeded," and block 403 may be followed by either block 401 or block 404 "disable cooperative caching," depending on the determination made in block 403.

In block 401, cache coherency engine 140 monitors the data block eviction rate for each of private caches 131-133 of CMP 100. In some embodiments, an eviction rate register, such as a register substantially similar to eviction rate register 135 in FIG. 1, may be used to monitor the data block eviction rate for each of private caches 131-133. In such embodiments, each eviction rate register 135 formed on die 109 may be configured as an element of an associated private cache, as an element of an owning processor core of the associated private cache, or as a separate circuit element. In some embodiments, each and every private cache 131-133 in CMP 100 is monitored in this way, and in other embodiments, only a representative sampling of the total private caches 131-133 of CMP 100 are monitored. Other techniques for monitoring the data block eviction rate of private caches 131-133 may also be used without exceeding the scope of the present disclosure, but will generally increase cost and/or latency of CMP 100.

In block 402, cache coherency engine 140 determines an aggregate eviction rate of data blocks from private caches 131-133. In some embodiments, an averaging module, such as a module substantially similar to averaging module 136 in FIG. 1, may be used to make such a determination. The operation of one embodiment of averaging module 136 is described above in conjunction with FIG. 1. By determining such an aggregate eviction rate, network traffic can be monitored with low latency using a very small number of additional transistors on die 109. Specifically, only one register per core plus a single averaging register may be used to implement such an embodiment. In some embodiments, each and every private cache 131-133 in CMP 100 is used to determine the aggregate eviction rate, and in other embodiments, only a representative sampling of the total private caches 131-133 of CMP 100 is used to make this determination. Other techniques for determining an aggregate eviction rate of data blocks from private caches 131-133 may also be used without exceeding the scope of the present disclosure.

In block 403, cache coherency engine 140 compares the aggregate eviction rate determined in block 402 with the threshold value or values for aggregate eviction rate provided to cache coherency engine 140 prior to method 400, and determines if said threshold values have been exceeded. For example, in some embodiments, a single threshold value is provided to cache coherency engine 140 prior to method 400, where the threshold value indicates that network flooding is imminent and cache coherency engine 140 should take steps immediately to prevent this. In other embodiments, multiple threshold values of aggregate eviction rate are provided to cache coherency engine 140 prior to method 400, and the aggregate eviction rate determined in block 402 is compared to each available threshold value. In such embodiments, each threshold value is selected to indicate a different condition of the network traffic in CMP 100. For example, one such threshold value may be selected to indicate that, when exceeded by the aggregate eviction rate determined in block 402, network flooding is imminent and cooperative caching should be completely disabled. Another such threshold value may comprise a caution threshold indicating that, when exceeded by the aggregate eviction rate determined in block 402, network flooding may potentially occur, and cooperative caching procedures implemented by cache coherence engine 140 should be modified. The comparison of the aggregate eviction rate determined in block 402 to threshold values that indicate other network traffic conditions in CMP 100 also falls within the scope of the present disclosure.

When cache coherence engine 140 determines that one or more threshold values have been exceeded by the aggregate eviction rate, method 400 proceeds to block 404. When no threshold values available to cache coherence engine 140 have been exceeded by the aggregate eviction rate, method 400 proceeds to block 401.

In block 404, in response to the determination made in block 403, cache coherence engine 140 disables cooperative caching in CMP 100. In some embodiments, cache coherence engine 140 can partially or completely disable cooperative caching in CMP 100 based on what network traffic threshold or thresholds are determined to be exceeded in block 403. For example, in one embodiment, when a caution threshold is exceeded in block 403, the risk of network flooding is reduced by halting replication of data blocks by replication engine 149. Such an embodiment reduces the risk of network flooding without completely disabling cooperative caching in CMP 100. In conventional implementations of cooperative caching, replication engine 149 fills up any unused storage space in private caches 131-133 with replicated copies of data blocks currently stored somewhere in aggregate cache 160. By halting replication of data blocks in multiple private caches 131-133, cross storage of data blocks between processor cores 121-123 is still allowed, so that when one of private caches 131-133 is filled and the processor core associated therewith requires more on-chip caching capability, data blocks originating from said processor core can be stored in other private caches 131-133 that have space available but are associated with a different processor core. However, because replication of data blocks is halted in step 404, many of private caches 131-133 are much more likely to have at least some space available for such cross storage, thereby greatly reducing the likelihood of data block spillage caused by the cyclical eviction and duplication of data blocks in private caches 131-133.

In another example, in one embodiment, when a network traffic threshold is exceeded in block 403 that indicates network flooding is imminent, network flooding is prevented. Specifically, cache coherency engine 140 halts cross storage of data blocks between processor cores 121-123, so that data blocks originating from a particular one of processor cores 121-123 are only stored in the private cache associated that particular processor core. Thus, in such an embodiment, data blocks originating from processor core 121 are only allowed to be stored in private cache 131, data blocks originating from processor core 122 are only allowed to be stored in private cache 132, and so on. In some embodiments, cache coherency engine 140 halts cross storage of data blocks by defining all values in memory entry tables 145 as unique. For example, a bit value associated with the uniqueness of each data block entry in memory entry tables 145 is updated to the suitable value indicating that the associated data block is unique, or a "singlet," rather than a "replicate" data block. Because the sharing action in cooperative caching schemes generally does not allow unique data to be overwritten, data blocks that are evicted from one of private caches 131-133 are not written to a neighboring private cache, when all data blocks in the neighboring private cache are defined as being unique. Consequently, there is no possibility of the cyclical eviction and duplication of data blocks in private caches 131-133 that results in network flooding in CMP 100. Timely detection of network flooding in this fashion allows cooperative caching to be disabled prior to a network flooding event, thereby maintaining stability of CMP 100 and avoiding the severe latency cost associated with such events.

In some embodiments, cache coherence engine 140 disables cooperative caching in block 404 for a predetermined time interval before returning to normal operation. In other embodiments, cache coherence engine 140 disables cooperative caching in block 404 until a predetermined number of operations or tasks are performed by CMP 100, and then returns to normal operation. In yet other embodiments, cache coherence engine 140 disables cooperative caching in block 404 until the monitored aggregate eviction rate falls below a predetermined threshold, such as the network traffic threshold described above in conjunction with block 404.

Figure 5:
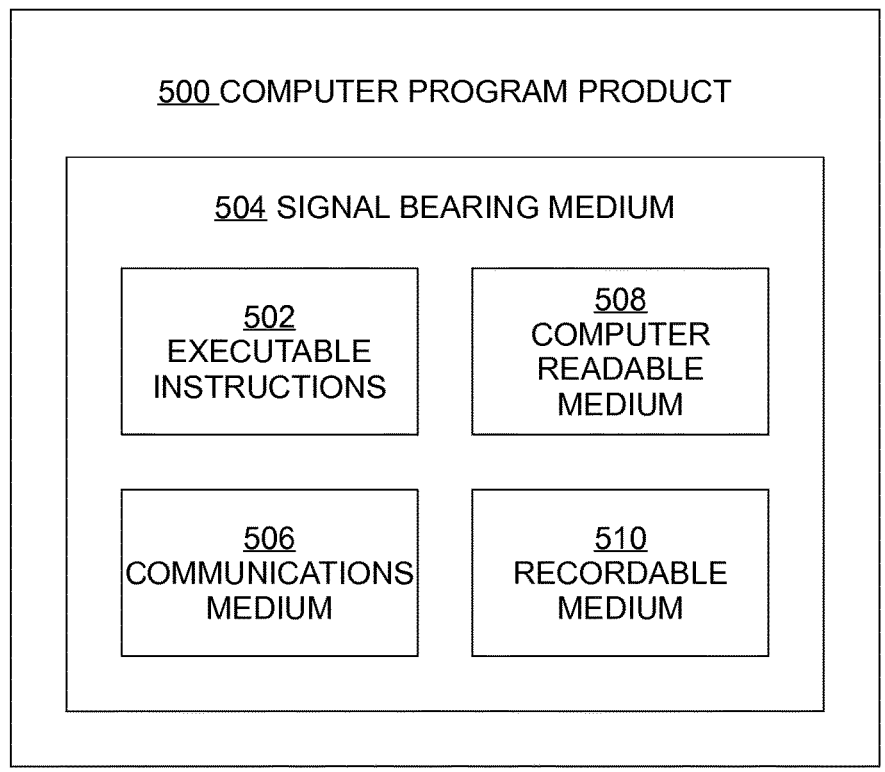
FIG. 5 is a block diagram of an illustrative embodiment of a computer program product for implementing a method for caching data in a chip multiprocessor having multiple processor cores, all arranged in accordance with at least some embodiments of the present disclosure.

FIG. 5 is a block diagram of an illustrative embodiment of a computer program product 500 for implementing a method for caching data in a chip multiprocessor having multiple processor cores, arranged in accordance with at least some embodiments of the present disclosure. Computer program product 500 may include a signal bearing medium 504. Signal bearing medium 504 may include one or more sets of executable instructions 502 that, when executed by, for example, a processor of a computing device, may provide at least the functionality described above with respect to FIG. 4.

In some implementations, signal bearing medium 504 may encompass a non-transitory computer readable medium 508, such as, but not limited to, a hard disk drive, a Compact Disc (CD), a Digital Video Disk (DVD), a digital tape, memory, etc. In some implementations, signal bearing medium 504 may encompass a recordable medium 510, such as, but not limited to, memory, read/write (R/W) CDs, R/W DVDs, etc. In some implementations, signal bearing medium 504 may encompass a communications medium 506, such as, but not limited to, a digital and/or an analog communication medium (e.g., a fiber optic cable, a waveguide, a wired communications link, a wireless communication link, etc.). Computer program product 500 may be recorded on non-transitory computer readable medium 508 or another similar recordable medium 510.

In sum, embodiments of the present disclosure provide systems and methods for cooperatively caching data in a chip multiprocessor having multiple processor cores. Because cooperative caching of data in the chip multiprocessor is managed based on an eviction rate of data blocks from private caches associated with each individual processor core in the chip multiprocessor, network flooding sometimes associated with cooperative caching in high core-count chip multiprocessors is advantageously avoided. Consequently, the advantages of cooperative caching can be applied to high core-count chip multiprocessors without the risk of network flooding.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to control caching of data in a chip multiprocessor having a plurality of processor cores, the method comprising:
   monitoring, by the chip multiprocessor, an eviction rate of a first private cache that is operated and used by a first processor core of the chip multiprocessor;
   monitoring, by the chip multiprocessor, an eviction rate of a second private cache that is operated and used by a second processor core of the chip multiprocessor;
   computing, by the chip multiprocessor, an aggregate eviction rate based on the monitored eviction rate of the first private cache and the monitored eviction rate of the second private cache;
   detecting, by the chip multiprocessor, that the aggregate eviction rate has exceeded a particular threshold; and
   in response to the detection, disabling, by the chip multiprocessor, cooperative caching for the chip multiprocessor.

2. The method of claim 1, wherein disabling the cooperative caching for the chip multiprocessor comprises partially disabling the cooperative caching for the chip multiprocessor.

3. The method of claim 2, wherein partially disabling the cooperative caching for the chip multiprocessor comprises halting replication of one or more data blocks stored in the first private cache or the second private cache.

4. The method of claim 1, wherein disabling the cooperative caching for the chip multiprocessor comprises completely disabling the cooperative caching for the chip multiprocessor.

5. The method of claim 4, wherein completely disabling the cooperative caching for the chip multiprocessor comprises preventing cross storage of one or more data blocks between the first processor core and the second processor core.

6. The method of claim 5, wherein preventing the cross storage of the one or more data blocks between the first processor core and the second processor core comprises at least one of:
   preventing one or more data blocks used by the first processor core from being stored in the second private cache; and
   preventing one or more data blocks used by the second processor core from being stored in the first private cache.

7. The method of claim 5, wherein preventing the cross storage of the one or more data blocks between the first processor core and the second processor core comprises designating each data block stored in the first private cache and the second private cache as a unique data block.

8. The method of claim 1, wherein disabling the cooperative caching for the chip multiprocessor comprises disabling the cooperative caching for a particular time interval.

9. The method of claim 1, wherein disabling the cooperative caching for the chip multiprocessor comprises disabling the cooperative caching until a particular number of operations are performed by the chip multiprocessor.

10. The method of claim 1, wherein detecting that the aggregate eviction rate has exceeded the particular threshold comprises detecting that the aggregate eviction rate has exceeded a first threshold.

11. The method of claim 10, wherein in response to the detection that the aggregate eviction rate has exceeded the first threshold, halting replication of one or more data blocks stored in the first private cache or the second private cache.

12. The method of claim 10, wherein detecting that the aggregate eviction rate has exceeded the particular threshold comprises detecting that the aggregate eviction rate has exceeded a second threshold, wherein the second threshold is higher than the first threshold.

13. The method of claim 12, wherein in response to the detection that the aggregate eviction rate has exceeded the second threshold, preventing cross storage of one or more data blocks between the first processor core and the second processor core.

14. The method of claim 1, wherein monitoring the eviction rate of the first private cache comprises counting evictions from an eviction counter associated with the first private cache, and wherein monitoring the eviction rate of the second private cache comprises counting evictions from an eviction counter associated with the second private cache.

15. The method of claim 1, wherein computing the aggregate eviction rate comprises measuring a number of evictions performed over a time period from private caches that are disposed on the chip multiprocessor.

16. The method of claim 15, wherein computing the aggregate eviction rate further comprises polling an eviction register of each private cache for which the number of evictions performed therefrom over the time period is measured.

17. A chip multiprocessor formed on a single die, the chip multiprocessor comprising:
   a first processor core;
   a first private cache that is operated and used by the first processor core;
   a second processor core;
   a second private cache that is operated and used by the second processor core;
   a first eviction counter that corresponds to the first private cache;
   a second eviction counter that corresponds to the second private cache; and a cache coherence engine coupled to the first private cache and the second private cache, wherein the cache coherence engine is configured to:
control cross storage of data blocks between the first processor core and the second processor core based on an aggregation of data polled from the first eviction counter and the second eviction counter.

18. The chip multiprocessor of claim 17, wherein the cache coherence engine is configured to control the cross storage of the data blocks between the first processor core and the second processor core by control of storage of data blocks used by the first processor core in the second private cache, and by control of storage of data blocks used by the second processor core in the first private cache.

19. The chip multiprocessor of claim 17, wherein the cache coherence engine is configured to control the cross storage of the data blocks between the first processor core and the second processor core based on an eviction rate of the data blocks from the first private cache and the second private cache, and wherein the eviction rate is determined by the aggregation of data polled from the first eviction counter and the second eviction counter.

20. A non-transitory computer-readable medium including instructions that, in response to execution by a chip multiprocessor, cause the chip multiprocessor to perform or cause to be performed:
monitor an eviction rate of a first private cache that is operated and used by a first processor core of the chip multiprocessor;
monitor an eviction rate of a second private cache that is operated and used by a second processor core of the chip multiprocessor;
compute an aggregate eviction rate based on the monitored eviction rate of the first private cache and the monitored eviction rate of the second private cache;
detect that the aggregate eviction rate has exceeded a particular threshold; and
in response to the detection, disable cooperative caching for the chip multiprocessor.

21. The non-transitory computer-readable medium of claim 20, wherein to compute the aggregate eviction rate, the instructions, in response to execution by the chip multiprocessor, cause the chip multiprocessor to perform or cause to be performed:
measure a number of evictions performed over a time period from private caches that are disposed on the chip multiprocessor.

22. The non-transitory computer-readable medium of claim 21, wherein to disable the cooperative caching for the chip multiprocessor, the instructions, in response to execution by the chip multiprocessor, cause the chip multiprocessor to perfoim or cause to be performed:
halt a replication engine from replication of one or more data blocks stored in the first private cache or the second private cache, in response to the detection that the aggregate eviction rate has exceeded a first threshold; and
prevent cross storage of the one or more data blocks between the first processor core and the second processor core, in response to the detection that the aggregate eviction rate has exceeded a second threshold, wherein the second threshold is larger than the first threshold.

23. The non-transitory computer-readable medium of claim 20, wherein to disable the cooperative caching for the chip multiprocessor, the instructions, in response to execution by the chip multiprocessor, cause the chip multiprocessor to perform or cause to be performed:
disable the cooperative caching for a particular time interval.

* * * * *

UNITED STATES PATENT AND TRADEMARK OFFICE
CERTIFICATE OF CORRECTION

PATENT NO. : 10,049,045 B2
APPLICATION NO. : 15/450020
DATED : August 14, 2018
INVENTOR(S) : Kruglick Page 1 of 1

It is certified that error appears in the above-identified patent and that said Letters Patent is hereby corrected as shown below:

In the Claims

In Column 16, Line 17, in Claim 22, please delete "perfoim" and insert -- perform -- therefor.

Signed and Sealed this
Thirty-first Day of March, 2020

Andrei Iancu
*Director of the United States Patent and Trademark Office*